US 6,686,403 B2

United States Patent
Magdina et al.

(10) Patent No.: US 6,686,403 B2
(45) Date of Patent: Feb. 3, 2004

(54) PAINT, AND METHOD OF PRODUCING THE SAME

(75) Inventors: Roman Magdina, Kanianka (SK); Bohuslav Jacko, Prievidza (SK)

(73) Assignee: Moles Technology a.s., Bratislava (SK)

( * ) Notice: Subject to any disclaimer, the term of this patent is extended or adjusted under 35 U.S.C. 154(b) by 0 days.

(21) Appl. No.: 10/023,949

(22) Filed: Dec. 21, 2001

(65) Prior Publication Data

US 2002/0165299 A1 Nov. 7, 2002

Related U.S. Application Data

(60) Provisional application No. 60/280,789, filed on Apr. 2, 2001.

(51) Int. Cl.$^7$ ................................................. C08K 5/34
(52) U.S. Cl. ........................................ 524/100; 524/416
(58) Field of Search ................................. 524/100, 416

(56) References Cited

U.S. PATENT DOCUMENTS 6,251,961 B1 * 6/2001 Pirig et al. .................. 521/179

* cited by examiner

*Primary Examiner*—Kriellion A. Sanders
(74) *Attorney, Agent, or Firm*—I. Zborovsky

(57) ABSTRACT

A paint has a film-forming binder component, a color-producing component, and a fire-retardant component adapted to least substantially protect from fire a surface of which the paint is applied; and the paint is produced by a method including providing a film-forming binder component; providing a color-producing component; mixing the components with some of dried powder components missing; and adding afire retardant component to replace the dry powder component.

10 Claims, No Drawings

PAINT, AND METHOD OF PRODUCING THE SAME

This application claims the benefit of Provisional Application No. 60/280,789, filed Apr. 2, 2001.

BACKGROUND OF THE INVENTION

The present invention generally relates to paints, and methods of producing paints.

Paints are widely known and utilized in industry, household, and other areas of modern life. Known paints usually include a film-forming binder component which provides formation of a film and adhesion to a substrate on which the paint is to be applied, and also include a color-producing component, such as for example pigments and other coloring agents.

While the known paints provide a certain protection of surfaces on which they are applied from deleterious action of atmosphere and impart certain colors to the surfaces on which they are applied, they do not adequately protect the surfaces of the substrates of the consequences of a fire. It is believed to be advisable to eliminate this disadvantage.

SUMMARY OF THE INVENTION

Accordingly, it is an object of the present invention to provide a paint which avoids the disadvantages of the prior art, and a method of producing a paint.

In keeping with these objects and with others which will become apparent hereinafter, one feature of present invention resides, briefly stated, in a paint which has a film-forming binder component; a color-producing component; and a fire-retardant component adapted to at least substantially protect from fire a surface of which the paint is applied.

When the paint is designed in accordance with the present invention, then in addition to conventional characteristics of the paint it also protects a surface of a substrate in which it is applied at least substantially from consequences of fire, in many cases it increases a corrosion resistance, and lengthens the service life of the paint.

In accordance with a further feature of the present invention the fire retardant component includes at least one phosphate or its derivative, such as melamine polyphosphate, ammonium polyphosphate.

In accordance with still a further feature of the present invention the fire retardant component includes melamine or is derivative selected from the group consisting of melamine cyanurate, melamine borate, melamine polyphosphate, melamine diphosphate, melamine pyrophosphate and melamine phosphate.

Also, in accordance with a present invention a method for producing a paint is proposed, which has the steps of providing a film-forming binder component; providing a color-producing component, mixing the components with some dried powder components missing; and adding a fire retardant component to replace the dry powder component.

The novel features which are considered as characteristic for the present invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

In accordance with the present invention a paint is provided which has a film-forming binder component; a color-producing component; and a fire-retardant component adapted to least substantially protect from fire a surface of which the paint is applied.

The fire retardant component can include phosphate or its derivative such as melamine polyphosphate, ammonium polyphosphate.

Also, the fire retardant component can include melamine or its derivative such as melamine cyanurate, melamine borate, melamine polyphosphate, melamine diphosphate, melamine pyrophosphate and melamine phosphate.

In the paint in accordance with the present invention the fire retardant component can include a charring agent, which is for example pentaerythritol, mono-pentaerythritol or di-pentaerythritol a blowing agent which for example is melamine, and an additional agent selected from the group of agents specified herein above.

It is to be understood that in addition to film generating substances (binding materials and softeners) which are one of the main components of paints which affect durability, shine, elasticity, bonding, flexibility and hardness, and also in addition to pigments which can be color powders not soluble in binders and soluble in color agents so as to create color variations and surface coloring capability the paint can also include volatile components which in combination with the binding materials create in most cases solution or so-called base lacquer (varnish). Also additives can be included in the paint, which are "helping" chemicals creating specific characteristics of the paints.

The paint in accordance with the present invention can be produced by a method which includes the steps of providing a film-forming binder component; providing a color-producing component, mixing said components with some of dried powder components missing; and adding a fire retardant component to replace the dry powder component.

In particular, fillers, such as for example calcium carbonate and titanium dioxide, are substituted by the fire retardant component. However, it is of course possible to substitute small amounts of film generating component.

The paint in accordance with the present invention is illustrated by the following examples:

EXAMPLE 1

Epoxy Paint-Two Components

Part A

| Function | Material | Weight % | |
|---|---|---|---|
| Part A | | | |
| Liquid Epoxy Resin | Epotuf 37-127 | 32.80 | Film Forming Binder |
| Diluent | Benzyl Alcohol | 3.75 | Film Forming Binder |
| Dispersant | BYK P-104S | 0.32 | Additives |
| Anti-Crater Additive | BYK A-530 | 0.15 | Additives |
| Flow Additive | BYK 501 | 0.16 | Additives |
| Prime Pigment | Titanox2020 | 12.3 | Color Producing Component |
| Extender | Microna 7 | 18.99 | Dry Powder Component |
| Blowing Agent | Melamine | 5.25 | Fire Retardant Component |
| Catalyst | Melamine Polyphosphate | 4.50 | Fire Retardant Component |
| Carbonific | Pentaerythritol | 5.25 | Fire Retardant Component |

-continued

| Function | Material | Weight % | |
|---|---|---|---|
| Part B | | | |
| Polyamine Hardener | Epotuf 37-801 | 13.32 | Film Forming Binder |
| Diluent | Benzyl Alcohol | 3.21 | Film Forming Binder |
| | | 100.00 | |

Mix Part A/Part B 4/1 by Volume

EXAMPLE 2

Alkyd Undercoat

| Function | Material | Weight % | |
|---|---|---|---|
| Medium Oil Aklyd 80% | Beckosol AA-203 | 31.48 | Film Forming Binder |
| Solvent | Mineral Spirits | 21.94 | Volatile Component |
| Dispersant | Soya Lecithin | 0.13 | Additives |
| Thixotrops | Thixatrol ST | 0.32 | Thixotrope |
| Sag Control | Post 4 | 0.44 | Thixotrope |
| Cobalt Drier | 12% Cobalt Naphthenate | 0.08 | Additives |
| Calcium Drier | 6% Calcium Naphtenate | 0.78 | Additives |
| Anti-Skin Agent | Methyl Ethyl Ketoxine | 0.33 | Additives |
| Prime Pigment | Tipure 902 | 21.40 | Color Producing Comp |
| Extender Pigment | Nicron 604 | 8.12 | Dry Powder Component |
| Blowing Agent | Melamine | 5.25 | Fire Retardant Component |
| Catalyst | Melamine Polyphosphate | 4.50 | Fire Retardant Component |
| Carbonific | Pentaerytritol | 5.25 | Fire Retardant Component |
| | | 100.00 | |

EXAMPLE 3

Urethane Enamel

| Function | Material | Weight % | |
|---|---|---|---|
| Oil Modified Polyurethane | Spenkel F47-M-60 | 50.10 | Film Forming Binder |
| Dispersant | Nuosperes 657 | 0.46 | Additives |
| Thixotrope | Bentone SD-1 | 0.95 | Thixotrope |
| Solvent | Mineral Spirits | 6.18 | Volatile Component |
| Prime Pigment | Tronox CR-828 | 23.90 | Color Producing Comp |
| Cobalt Drier | 12% Cobalt Naphthenate | 0.38 | Additives |
| Calcium Drier | 6% Calcium Naphthenate | 1.26 | Additives |
| Zirconium Drier | 24% Zirconium Naphthanete | 1.61 | Additives |
| Anti-Skin Agent | Exkin #2 | 0.11 | Additives |
| Blowing Agent | Melamine | 5.25 | Fire Retardant Component |
| Catalyst | Melamine Polyphosphate | 4.50 | Fire Retardant Component |
| Carbonific | Pentaerytritol | 5.25 | Fire Retardant Component |
| | | 100.00 | |

EXAMPLE 4

Strippable Vinyl Coating

| Function | Material | Weight % | |
|---|---|---|---|
| Vinyl Resin High M.W. | Ucar YVNS | 7.38 | Film Forming Binder |
| Vinyl Resin Low M.W. | Ucar VYHD | 3.69 | Film Forming Binder |
| Plasticizer | Dioctyl Phthalate | 2.88 | Film Forming Binder |
| White Pigment | TiPure 902 | 6.50 | Color Producing Component |
| Diluent | Toluene | 22.20 | Volatile Component |
| Ketone Solvent | Methyl Isobutyl Ketone | 20.95 | Volatile Component |
| Acetate Solvent | Butyl Acetate | 21.40 | Volatile Component |
| Blowing Agent | Melamine | 5.25 | Fire Retardant Component |
| Catalyst | Melamine Polyphosphate | 4.50 | Fire Retardant Component |
| Carbonific | Pentaerythritol | 5.25 | Fire Retardant Component |
| | | 100.00 | |

EXAMPLE 5

Nitrocellulose Satin Lacquer

| Function | Material | Weight % | |
|---|---|---|---|
| Low MW Nitrocellulose | Nitrocellulose ¼ sec | 6.75 | Film Forming Binder |
| High MW Nitrocellulose | Nitrocellulose ½ sec | 0.10 | Film Forming Binder |
| Diluent | Toluene | 13.75 | Volatile Component |
| Lateral Solvent | Isopropanol | 2.70 | Volatile Component |
| Fast Solvent | Butyl Acetate | 27.60 | Volatile Component |
| Slow Solvent | PM Acetate | 2.70 | Volatile Component |
| Coconut Alkyd 70% in BA | Bookosol 91-470 | 12.78 | Film Forming Binder |
| Plasticizer | Dioctyl Phthalate | 1.34 | Film Forming Binder |
| White Pigment | TiPure 902 | 9.80 | Color Producing Comp |
| Crosslinker | Cymel 303 | 6.95 | Film Forming Binder |
| Crosslinker Catalyst | Butyl Acid Phosphate | 0.53 | Additives |
| Blowing Agent | Melamine | 5.25 | Fire Retardant Component |
| Catalyst | Melamine Polyphosphate | 4.50 | Fire Retardant Component |
| Carbonific | Pentaerythritol | 5.25 | Fire Retardant Component |
| | | 100.00 | |

EXAMPLE 6

Eggshell Latex Paint

| Function | Material | Weight % | |
|---|---|---|---|
| Solvent | Water | 25.3 | Volatile Component |
| Dispersant | Potassium Tripolyphosphate | 0.22 | Additives |
| Surfactant | Igepal CO-630 | 0.84 | Additives |
| Defoamer | Colloid 643 | 0.23 | Additives |
| Wet Edge Control | Propylene Glycol | 2.77 | Additives |
| Biocide | Nuosept 95 | 0.38 | Additives |
| White Pigment | Tipure 902 | 18.14 | Color Producing Comp |
| Blowing Agent | Melamine | 5.25 | Fire Retardant Component |
| Catalyst | Melamine Polyphosphate | 4.5 | Fire Retardant Component |
| Carbonific | Pentaerythritol | 5.25 | Fire Retardant Component |
| Celluolosic Thickener | Bernocol E411 FQ | 0.32 | Thixotrope |

-continued

| Function | Material | Weight % | |
|---|---|---|---|
| Latex Polymer 55% | Rovace 9100 | 34.88 | Film Forming Binder |
| pH Adjustment | 28% Ammonia Hydroxide | 0.13 | Additives |
| Associative Thickener | Acrysol RM-5 | 1.82 | Thixotrope |
| | | 100.00 | |

Method of Preparation

The above samples were prepared by a Cowles High Speed Disperser. Following a normal paint manufacture technique, the powdered materials were dispersed at high-speed into a suitable amount of the vehicle which contained the dispersants and wetting agents. After the dispersion was complete the speed was reduced balance of the vehicle was added together with the remaining ingredients in the formula.

EXAMPLE 7
Acrylic Powder Coating

| Function | Material | Weight % | |
|---|---|---|---|
| Glycidyl Acrylic Polymer | Fine-Clad A-207-SA | 56.90 | Film Forming Binder |
| Crosslinker | Dodecanedioic Acid | 10.83 | Film Forming Binder |
| Flow Additive | Silwet L-7500 | 0.33 | Additives |
| White Pigment | Titanox 2020 | 16.94 | Color Producing Comp |
| Blowing Agent | Melamine | 5.26 | Fire Retardant Component |
| Catalyst | Melamine Polyphosphate | 4.50 | Fire Retardant Component |
| Carbonific | Pentaerythritol | 5.28 | Fire Retardant Component |
| | | 100.00 | |

Bake Temperature: 20 minutes at 150 C.
Method of Preparation

Powders were mixed and blended using a W&P ZSK-30 Blender.
Barrel Temperature 60/80 C.
Screw Speed: 250 rpm.
Classification: 100% through 200 mesh.

As can be seen from the above presented examples, the fire-retardant part of the paint in accordance with the present invention is composed of three fire-retardant components, namely melamine, melamine polyphosphate, and pentaerythritol. These fire-retardant components can together amount to only 15 weight percent of the paint.

It will be understood that each of the elements described above, or two or more together, may also find a useful application in other types of substances and methods differing from the types described above.

While the invention has been illustrated and described as embodied in paint, and method of producing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A paint for painting a surface in a predetermined color, comprising a film-forming binder component for forming a film of the paint on the surface; a color-producing component for providing the predetermined color on the surface; and a fire-retardant component adapted to protect the surface from consequences of fire; and additional components including a filler and en additive, wherein said fire retardant component includes in ratio by weight 35% melamine, 35% pentaerythritol, and 30% melamine polyphosphate.

2. A paint as defined in claim 1, wherein said fire retardant component includes 5.25 weight % of melamine, 5.25 weight % of pentaerythritol, and 4.50 weight % of melamine polyphosphate from total weight % of the paint.

3. A paint as defined in claim 1, wherein said fire retardant component does not exceed 15 weight % of the paint.

4. A paint as defined in claim 1, wherein the paint includes the following components: EXAMPLE 1

| Function | Material | Weight % | |
|---|---|---|---|
| Part A | | | |
| Liquid Epoxy Resin | Epotuf 37-127 | 32.80 | Film Forming Binder |
| Diluent | Benzyl Alcohol | 3.75 | Film Forming Binder |
| Dispersant | BYK P-104S | 0.32 | Additives |
| Anti-Crater Additive | BYK A-530 | 0.15 | Additives |
| Flow Additive | BYK 501 | 0.16 | Additives |
| Prime Pigment | Titanox2020 | 12.3 | Color Producing Component |
| Extender | Microna 7 | 18.99 | Dry Powder Component |
| Blowing Agent | Melamine | 5.25 | Fire Retardant Component |
| Catalyst | Melamine Polyphosphate | 4.50 | Fire Retardant Component |
| Carbonific | Pentaerythritol | 5.25 | Fire Retardant Component |
| Part B | | | |
| Polyamine Hardener | Epotuf 37-801 | 13.32 | Film Forming Binder |
| Diluent | Benzyl Alcohol | 3.21 | Film Forming Binder |
| | | 100.00 | |

Mix Part A/Part B 4/1 by volume

5. A paint as defined in claim 1, wherein the paint includes the following components: EXAMPLE 2

| Function | Material | Weight % | |
|---|---|---|---|
| Medium Oil Aklyd 80% | Beckosol AA-203 | 31.48 | Film Forming Binder |
| Solvent | Mineral Spirits | 21.94 | Volatile Component |
| Dispersant | Soya Lecithin | 0.13 | Additives |
| Thixotrops | Thixatrol ST | 0.32 | Thixotrope |
| Sag Control | Post 4 | 0.44 | Thixotrope |
| Cobalt Drier | 12% Cobalt Naphthenate | 0.08 | Additives |
| Calcium Drier | 6% Calcium Naphtenate | 0.78 | Additives |
| Anti-Skin Agent | Methyl Ethyl Ketoxine | 0.33 | Additives |

| Function | Material | Weight % |
|---|---|---|
| Prime Pigment | Tipure 902 | 21.38 Color Producing Comp |
| Extender Pigment | Nicron 604 | 8.12 Dry Powder Component |
| Blowing Agent | Melamine | 5.25 Fire Retardant Component |
| Catalyst | Melamine Polyphosphate | 4.50 Fire Retardant Component |
| Carbonific | Pentaerythritol | 5.25 Fire Retardant Component |
| | | 100.00 |

6. A paint as defined in claim 1, wherein the paint includes the following components: EXAMPLE 3

| Function | Material | Weight % |
|---|---|---|
| Oil Modified Polyurethane | Spenkel F47-M-60 | 50.10 Film Forming Binder |
| Dispersant | Nuosperes 657 | 0.46 Additives |
| Thixotrope | Bentone SD-1 | 0.95 Thixotrope |
| Solvent | Mineral Spirits | 6.18 Volatile Component |
| Prime Pigment | Tronox CR-828 | 23.95 Color Producing Comp |
| Cobalt Drier | 12% Cobalt Naphthenate | 0.38 Additives |
| Calcium Drier | 6% Calcium Naphthenate | 1.26 Additives |
| Zirconium Drier | 24% Zirconium Naphthanete | 1.61 Additives |
| Anti-Skin Agent | Exkin #2 | 0.11 Additives |
| Blowing Agent | Melamine | 5.25 Fire Retardant Component |
| Catalyst | Melamine Polyphosphate | 4.50 Fire Retardant Component |
| Carbonific | Pentaerytritol | 5.25 Fire Retardant Component |
| | | 100.00 |

7. A paint as defined in claim 1, wherein the paint includes the following components: EXAMPLE 4

| Function | Material | Weight % |
|---|---|---|
| Vinyl Resin High M.W. | Ucar YVNS | 7.38 Film Forming Binder |
| Vinyl Resin Low M.W. | Ucar VYHD | 3.69 Film Forming Binder |
| Plasticizer | Dioctyl Phthalate | 2.88 Film Forming Binder |
| White Pigment | TiPure 902 | 6.50 Color Producing Component |
| Diluent | Toluene | 22.20 Volatile Component |
| Ketone Solvent | Methyl Isobutyl Ketone | 20.95 Volatile Component |
| Acetate Solvent | Butyl Acetate | 21.40 Volatile Component |
| Blowing Agent | Melamine | 5.25 Fire Retardant Component |
| Catalyst | Melamine Polyphosphate | 4.50 Fire Retardant Component |
| Carbonific | Pentaerythritol | 5.25 Fire Retardant Component |
| | | 100.00 |

8. A paint as defined in claim 1, wherein the paint includes the following components: EXAMPLE 5

| Function | Material | Weight % |
|---|---|---|
| Low MW Nitrocellulose | Nitrocellulose ¼ sec | 6.75 Film Forming Binder |
| High MW | Nitrocellulose | 0.10 Film Forming Binder |
| Nitrocellulose | ½ sec | |
| Diluent | Toluene | 13.75 Volatile Component |
| Lateral Solvent | Isopropanol | 2.70 Volatile Component |
| Fast Solvent | Butyl Acetate | 27.60 Volatile Component |
| Slow Solvent | PM Acetate | 2.70 Volatile Component |
| Coconut Alkyd 70% in BA | Bookosol 91-470 | 12.78 Film Forming Binder |
| Plasticizer | Dioctyl Phthalate | 1.34 Film Forming Binder |
| White Pigment | TiPure 902 | 9.80 Color Producing Comp |
| Crosslinker | Cymel 303 | 6.95 Film Forming Binder |
| Crosslinker Catalyst | Butyl Acid Phosphate | 0.53 Additives |
| Blowing Agent | Melamine | 5.25 Fire Retardant Component |
| Catalyst | Melamine Polyphosphate | 4.50 Fire Retardant Component |
| Carbonific | Pentaerythritol | 5.25 Fire Retardant Component |
| | | 100.00 |

9. A paint as defined in claim 1, wherein the paint includes the following components: EXAMPLE 6

| Function | Material | Weight % |
|---|---|---|
| Solvent | Water | 25.3 Volatile Component |
| Dispersant | Potassium Tripolyphosphate | 0.22 Additives |
| Surfactant | Igepal CO-630 | 0.84 Additives |
| Defoamer | Colloid 643 | 0.23 Additives |
| Wet Edge Control | Propylene Glycol | 2.77 Additives |
| Biocide | Nuosept 95 | 0.38 Additives |
| White Pigment | Tipure 902 | 18.14 Color Producing Comp |
| Blowing Agent | Melamine | 5.25 Fire Retardant Component |
| Catalyst | Melamine Polyphosphate | 4.5 Fire Retardant Component |
| Carbonific | Pentaerythritol | 5.25 Fire Retardant Component |
| Celluolosic Thickener | Bernocol E411 FQ | 0.32 Thixotrope |
| Latex Polymer 55% | Rovace 9100 | 34.88 Film Forming Binder |
| pH Adjustment | 28% Ammonia Hydroxide | 0.13 Additives |
| Associative Thickener | Acrysol RM-5 | 1.82 Thixotrope |
| | | 100.00 |

Method of Preparation

The above samples were prepared by a Cowles High Speed Disperser. Following a normal paint manufacture technique, the powdered materials were dispersed at highspeed into a suitable amount of the vehicle which contained the dispersants and wetting agents. After the dispersion was complete the speed was reduced balance of the vehicle was added together with the remaining ingredients in the formula.

10. A paint as defined in claim 1, wherein the paint includes the following components: EXAMPLE 7

| Function | Material | Weight % |
|---|---|---|
| Glycidyl Acrylic Polymer | Fine-Clad A-207-SA | 56.90 Film Forming Binder |
| Crosslinker | Dodecanedioic Acid | 10.83 Film Forming Binder |
| Flow Additive | Silwet L-7500 | 0.33 Additives |
| White Pigment | Titanox 2020 | 16.94 Color Producing Comp |

-continued

| Function | Material | Weight % | |
|---|---|---|---|
| Blowing Agent | Melamine | 5.26 | Fire Retardant Component |
| Catalyst | Melamine Polyphosphate | 4.50 | Fire Retardant Component |
| Carbonific | Pentaerythritol | 5.28 | Fire Retardant Component |
| | | 100.00 | |

Bake Temperature: 20 minutes at 150 C.

Method of Preparation

Powders were mixed and blended using a W&P ZSK-30 Blender.

Barrel Temperature 60/80 C.

Screw Speed: 250 RPM.

Classifiction: 100% through 200 mesh.

* * * * *